United States Patent
French et al.

(10) Patent No.: US 9,159,068 B2
(45) Date of Patent: Oct. 13, 2015

(54) SERVICE MANAGEMENT USING USER EXPERIENCE METRICS

(75) Inventors: Paul Basil French, Cork (IE); Fred Raguillat, Meath (IE); Edith Helen Stern, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 571 days.

(21) Appl. No.: 12/902,338

(22) Filed: Oct. 12, 2010

(65) Prior Publication Data

US 2012/0089705 A1    Apr. 12, 2012

(51) Int. Cl.
*G06F 3/00* (2006.01)
*G06Q 30/00* (2012.01)
*G06Q 30/02* (2012.01)

(52) U.S. Cl.
CPC ............ *G06Q 30/01* (2013.01); *G06Q 30/0281* (2013.01)

(58) Field of Classification Search
CPC ......................................... G06F 3/01

USPC .................................................. 709/219, 224
See application file for complete search history.

(56) References Cited

U.S. PATENT DOCUMENTS

| | | | |
|---|---|---|---|
| 2004/0147814 A1* | 7/2004 | Zancho et al. | 600/300 |
| 2007/0074114 A1* | 3/2007 | Adjali et al. | 715/706 |
| 2008/0096533 A1 | 4/2008 | Manfredi et al. | |
| 2009/0002178 A1 | 1/2009 | Guday et al. | |
| 2009/0140864 A1 | 6/2009 | Aaron et al. | |
| 2010/0050078 A1* | 2/2010 | Refuah et al. | 715/706 |
| 2011/0263946 A1* | 10/2011 | el Kaliouby et al. | 600/300 |

* cited by examiner

*Primary Examiner* — Glenford Madamba
(74) *Attorney, Agent, or Firm* — Garg Law Firm, PLLC; Rakesh Garg; Parashos T. Kalaitzis

(57) ABSTRACT

A method, system, and computer usable program product to determine a first mood of the user, where the first mood is based on a characteristic of the user at a first time during the providing of an online service and to determine a second mood of the user, where the second mood is based on a characteristic of the user at a second time during the providing of the online service. The first mood of the user and the second mood of the user are compared to determine a delta or change in mood of the user.

16 Claims, 7 Drawing Sheets

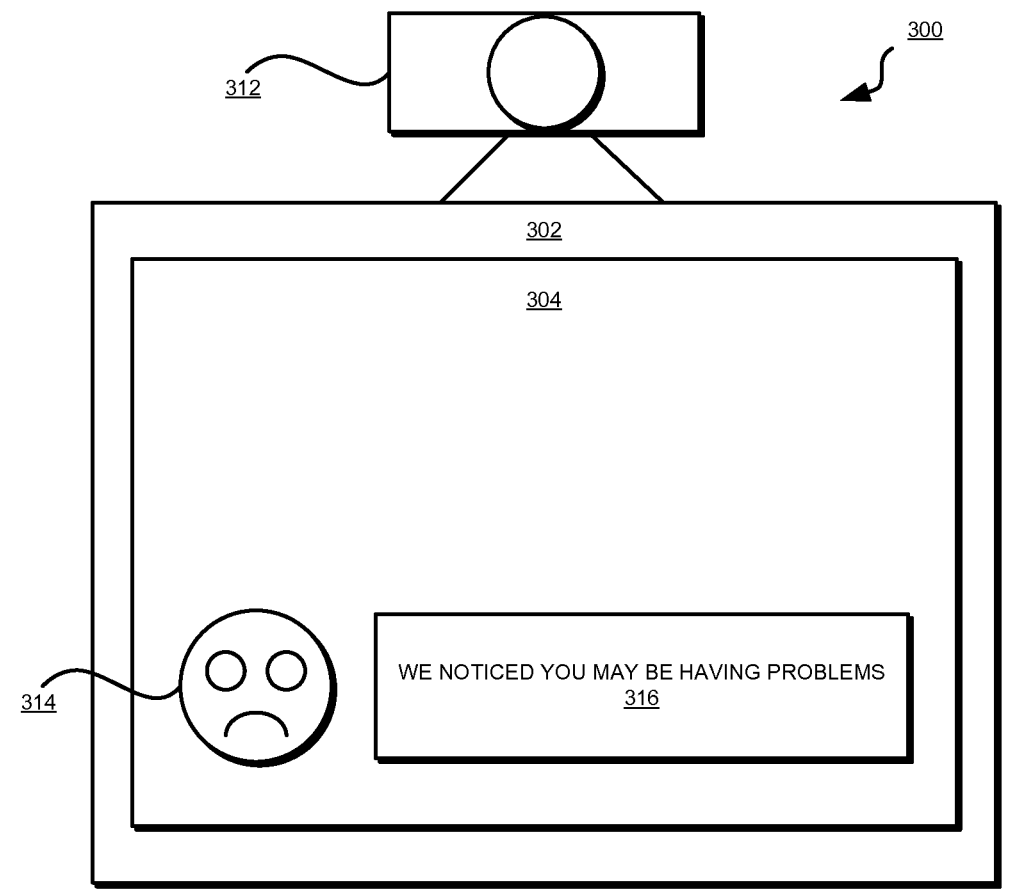
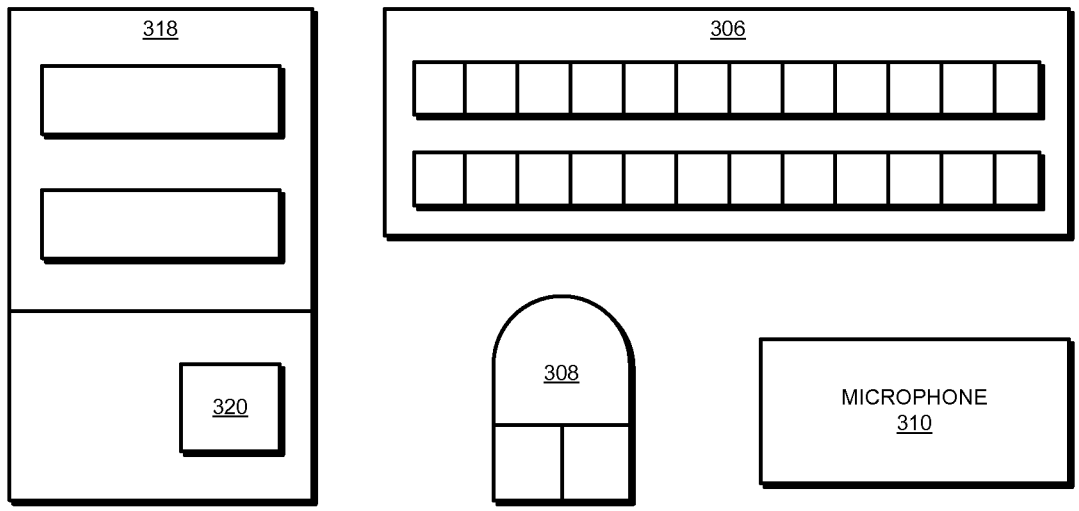
FIG. 3

FIG. 4

Table 402:

| TIME 404 | MOOD 406 | Δ MOOD 408 | ACTION 410 | NET. METRIC 412 | Δ NET. METRIC 414 | APP. METRIC 416 | Δ APP. METRIC 418 |
|---|---|---|---|---|---|---|---|
| 0000 | 8 |  | STARTED ONLINE SERVICE | 6 |  | 8 |  |
| 0001 | 6 | ↓ -2 | CLICKED SEVERAL LINKS | 6 | ↔ 0 | 6 | ↓ -2 |
| 0002 | 7 | ↑ +1 | NO ACTION | 6 | ↔ 0 | 7 | ↑ +1 |
| 0003 | 7 | ↔ 0 | CLICKED ICON | 6 | ↔ 0 | 7 | ↔ 0 |
| 0004 | 6 | ↓ -1 | CLICKED ICON REPEATEDLY | 3 | ↓ -3 | 6 | ↓ -1 |
| 0005 | 5 | ↓ -1 | ENDED ONLINE SERVICE | 4 | ↑ +1 | 6 | ↔ 0 |

Rows: 420, 422, 424, 426, 428, 430. Annotations: 432, 434, 436.

Table 438:

| TIME 404 | MOOD 406 | Δ MOOD 408 | ACTION 410 | NET. METRIC 412 | Δ NET. METRIC 414 | APP. METRIC 416 | Δ APP. METRIC 418 |
|---|---|---|---|---|---|---|---|
| 0000 | 2 |  | STARTED ONLINE SERVICE | 5 |  | 8 |  |
| 0001 | 3 | ↓ -2 | CLICKED SEVERAL LINKS | 8 | ↑ +3 | 6 | ↓ -2 |
| 0002 | 4 | ↑ +1 | NO ACTION | 6 | ↓ -2 | 7 | ↑ +1 |
| 0003 | 5 | ↔ 0 | CLICKED ICON | 5 | ↓ -1 | 7 | ↔ 0 |
| 0004 | 5 | ↔ 0 | ENDED ONLINE SERVICE | 4 | ↓ -1 | 6 | ↔ -1 |

Rows: 440, 442, 444, 446, 448.

SERVICE MANAGEMENT USING USER EXPERIENCE METRICS

BACKGROUND OF THE INVENTION

1. Field of the Invention

The present invention relates generally to improved electronic commerce, and in particular, to a computer implemented method for measuring and managing the experience of using an online service. More particularly, the present invention relates to a computer implemented method, system, and computer usable program code for measuring the subjective experience of a user using an online service.

2. Description of the Related Art

The amount of trade conducted through online service events has grown extraordinarily with widespread use of the Internet. Almost all big retailers have some online presence and a user can go online to purchase anything from books or groceries, to expensive items like cars or real estate from the privacy of the consumer's home.

One of the problems with an online service event is that the service provider's physical presence is removed from the consumer and it can be difficult to obtain a subjective measure of a consumer's satisfaction during the online service event. The subjective measurement is a quality of consumer's experience of how a consumer feels about an online service event they are performing or have just performed, such as a voice call, or purchasing goods or services.

Collecting subjective measures from a consumer is usually done using some method of a user survey after the service is completed, for example, selecting a satisfaction value of between one (1) and five (5) following the completion of a purchase. The problem with this approach is that many consumers do not participate in surveys and if a consumer had experienced an unacceptable service event, such as a poor response time while executing a transaction, often the user will just quit and never complete the online service event or answer a survey to help the retailer avoid problems in the future. For example, by assigning more resources to the user transaction, without understanding that the user experience is poor, the service will not know that such changes are warranted.

SUMMARY OF THE INVENTION

The illustrative embodiments provide a method, system, and computer usable program product with respect to optimization of service management using metrics indicative of subjective user experience. An embodiment determines a first mood of a user, where the first mood is based on a characteristic of the user at a first time during the providing of an online service. The embodiment determines a second mood of the user, wherein the second mood is based on a characteristic of the user at a second time during the providing of the online service. The first mood of the user and the second mood of the user are compared to determine a delta or change in mood of the user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a block diagram of an example device with respect to optimization of service management using subjective user experience metrics in accordance with an illustrative embodiment;

FIG. 4 depicts example time logs with respect to service management using user experience metrics in accordance with an illustrative embodiment;

DETAILED DESCRIPTION OF THE PREFERRED EMBODIMENT

Figure 1:
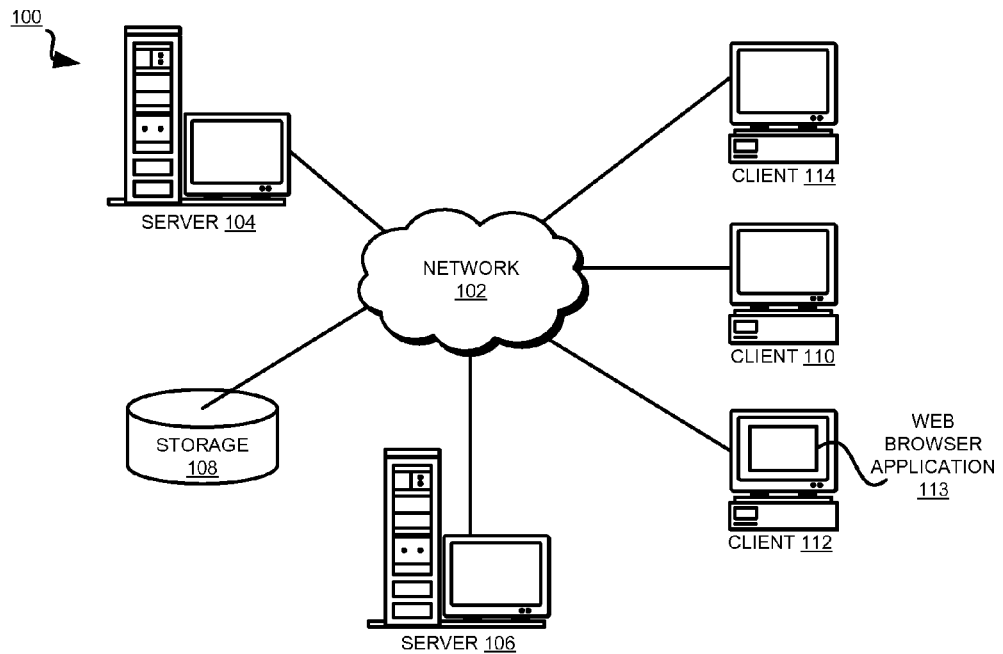
FIG. 1 depicts a pictorial representation of a network of data processing systems in which the illustrative embodiments may be implemented.

For the purposes of this disclosure, an online service may be any service delivered or provided to a user using a network of any type, including but not limited to synchronous and asynchronous data services, voice services, audio-visual services, and interactive web-based services.

The invention recognizes the need to obtain a subjective measure of a user's satisfaction during an online service event in order to increase the user's satisfaction and improve the online service event for the current user, and other potential users. The invention further recognizes that relatively few users want to fill out a survey, especially if they are dissatisfied with the online service event.

Some systems and methods attempt to measure a user's satisfaction by measuring the current emotional state of the user without any reference to a previous emotional state of the user. However, those systems and methods do not take into account the changes in emotional state of the user, that is the difference between the emotional state of the user at a first time, and the emotional state of the user at a second time.

The illustrative embodiments used to describe the invention generally address and solve the above-described problems and other problems related to the optimization of service management using subjective user experience metrics. The illustrative embodiments of the invention provide a method, computer usable program product, and processing system for the optimization of service management using subjective user experience metrics. The invention recognizes that measuring the delta or change in mood during or after the service can be used to get an indication that using the service improved or decreased the user's mood, regardless of the mood the user was in the first time when the mood or emotional state was evaluated. For purposes of this application, the terms emotions and moods are used interchangeably.

The illustrative embodiments are described with respect to data, data structures, and identifiers only as examples. Such descriptions are not intended to be limiting on the invention. For example, an illustrative embodiment described with respect to single piece of information may be implemented using a combination of several pieces of information, in a similar manner within the scope of the invention.

Furthermore, the illustrative embodiments may be implemented with respect to any type of data processing system. For example, an illustrative embodiment described with respect to a single-processor standalone data processing system may be implemented in a multiprocessor logical partition system, or any other organization of data processing systems, such as rack configurations in a data center, within the scope of the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention. For example, an illustrative embodiment described with respect to numeric attribute may be implemented using an alphanumeric attribute, a symbolic attribute, or a combination thereof, in a similar manner within the scope of the invention.

An application implementing an embodiment may take the form of data objects, code objects, encapsulated instructions, application fragments, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
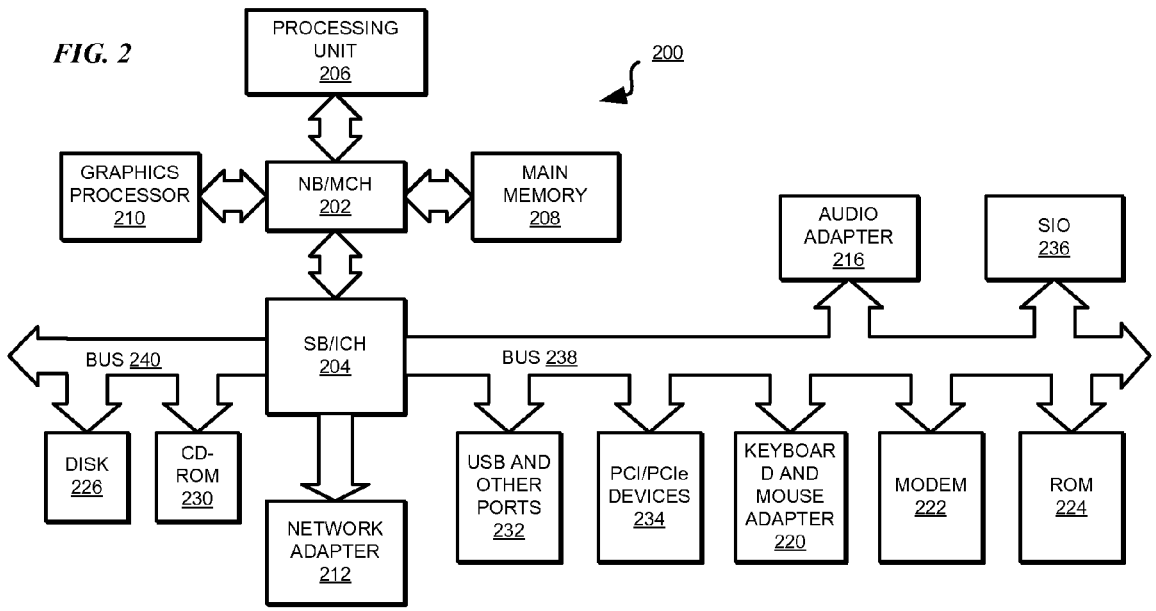
FIG. 2 depicts a block diagram of a data processing system in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon. Client 112 may include web browser application 113. A web browser application is any application usable for accessing data over a data network.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations. In some configurations, processing unit 206 may include NB/MCH 202 or parts thereof.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). In some configurations, ROM 224 may be an Electrically Erasable Programmable Read-Only Memory (EEPROM) or any other similarly usable device. Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc. or Oracle Corporation, in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA. With reference to FIG. 3, this figure depicts a block diagram of an example device configuration usable for service management using user experience metrics and with respect to which an illustrative embodiment may be implemented. Optimization of service management application 300 may be any application able to receive information related to the use of an online service, such as web browser application 113 in client 112 in FIG. 1. Other systems or applications may also include manifestations of a device to navigate the Web within the scope of the invention. Generally, any application representing an online service may be represented by application service within the scope of the invention, according to an embodiment described herein.

Optimization of service management application 300 accesses and navigates the Web and may include, application service page 304, display screen 302, keyboard 306, computer mouse 308, microphone 310, web camera 312, and data processing system 318. Screen 302 may be a display unit associated with client 112 in FIG. 1 that displays application service page 304. Application service page 304 may be a web page where a product or service can be purchased.

Data processing system 318 contains metric determination module 320. Metric determination module 320 determines a metric related to network performance and/or a metric related to application performance. Network performance may include, for example, a speed of the path, packet loss, router congestion/conditions, latency or delay, path reliability, path bandwidth, and throughput, or a combination thereof, for the network used for the online service. These example network performance metrics are not intended to be limiting on the invention. Many other additional or different network performance metrics will be apparent to those of ordinary skill in the art and the same are contemplated within the scope of the invention.

Application performance relates to the performance or use of the application that the user is currently using. For example, application performance metrics may include any combination of the application response time, number of mouse-clicks used when navigating the application, if a user clicks a wrong indicator, or if the user may be confused about using the application and did not press a "submit" or "purchase" indicator when prompted. These example application performance metrics are not intended to be limiting on the invention. Many other additional or different application performance metrics will be apparent to those of ordinary skill in the art and the same are contemplated within the scope of the invention.

In an embodiment, optimization of service management application 300 uses metric determination module 320 to help identify why a user may have experienced a change in mood metrics or emotional state metrics. For example, the speed of a specific path may be slow and the network metric may be low or the user may be confused about navigating the application and the application performance metric may be low, causing the user to become disappointed or disinterested in an online activity, and resulting in a change of mood metrics In another embodiment, metric determination module 320 can also identify and either implement potential solutions to network or application operation problems, or provide an indicator of such actions to a control system. For example, if the speed of a specific path is too slow and is deemed a probable cause of a change in user mood metrics, metric determination module 320 may switch to a different, faster path. As another example, if the user is confused about navigating the current application, a help window or tips on navigating the application may be presented to the user. Metric determination module 320 may be configured to detect and act upon these and several other emotions or moods without limitation.

In an embodiment, keyboard 306 may be a computer keyboard having a key sensing device that provides pressure sensing levels applied on the keys such that the use's emotional state may be determined. For example, if the user is hitting the keys very hard, metric determination module 320 may determine that the user may be frustrated or upset. In another embodiment, computer mouse 308 may be a computer mouse or trackball having a sensing device that provides pressure sensing levels applied to computer mouse 308 such that the user's emotional state may be determined. For example, if the user is hitting computer mouse 308 on a desk, gripping computer mouse 308 very hard, or making hard deliberate clicks with computer mouse 308, metric determination module 320 may determine that the user may be frustrated or upset.

In another embodiment, microphone 310 is in communication with an audio emotional state detecting system of metric determination module 320 that may analyze the user's voice to determine the emotional state of the user. For example, if the user's speech is at a higher than normal pitch or volume, or the user is using certain phrases or words, the audio emotional state detecting system of metric determination module 320 may conclude that the user is frustrated or upset. The audio emotional state detecting system may be located in data processing system 318 or at a location remote from data processing system 318 such that metric determination module 320 may have access to the audio emotional state detecting system over a data network. In another embodiment, web camera 312 is in communication with a visual emotional state detecting system of metric determination module 320 that may analyze the user's facial features and/or body language to determine the emotional state of the user. For example, if the user is pursing their lips, frowning, or furrowing their brows, the visual emotional state detecting system of metric determination module 320 may conclude that the user is frustrated or upset. The visual emotional state detecting system may be located in data processing system 318 or at a location remote from data processing system 318 such that metric determination module 320 may have access to the audio emotional state detecting system over a data network. By using keyboard 306, computer mouse 308, microphone 310, and web camera 312, either singularly or in any combination, an emotional state of the user may be determined. Other devices not shown may also be used to determine the emotional state of the user, for example a biometric sensor on the user device.

The characteristics of the user that are detected, and the peripherals or systems that are used for analyzing those characteristics are described only as examples and are not limiting on the invention. Other characteristics of the user can be detected using these and other peripherals and systems operating in conjunction with metric determination module 320 in a similar manner within the scope of the invention.

Application service page 304 may be an application interface, web page, or resource for navigating a service event. As an example, application service page 304 can be accessed through a web browser and displayed on a monitor, such as screen 302. Application service page 304 may optionally include user experience indicator 314, action indicator 316, or both. User experience indicator 314 and action indicator 316 may be presented in any manner suitable for a particular implementation without limitation on the invention. While the application service is described in terms of a visual page, the application service may instead be an audio or nonvisual data service such as a voice service.

User experience indicator 314 may display the current emotional state or mood of the user as understood by optimization of service management application 300. In an embodiment, the user can modify user experience indicator 314 and change the current emotional state or mood of the user as understood by optimization of service management application 300. In another embodiment, the user can customize user experience indicator 314. For example, to display a happy mood, user experience indicator 314 may display a rainbow or sunshine graphic or image and to display an unhappy or frustrated mood, user experience indicator 314 may display a raincloud graphic or image.

Action indicator 316 may present information about actions or suggestions that may help change the user's mood, such as when the user is frustrated or upset. For example, action indicator 316 may inform the user that a specific network path is too slow and may be causing the user frustration. In addition, action indicator 316 may display that the optimization of service management application 300 is attempting to switch to a different, faster network path. In addition, action indicator 316 may display suggestions or tips on how to navigate application service page 304 or suggest that the user contact customer support or that a person from customer support will be contacting the user.

With reference to FIG. 4, this figure depicts example time logs for service management using user experience metrics in accordance with an illustrative embodiment. Tables 402 and 438 may be generated from an optimization of service management application, such as optimization of service management application 300 in FIG. 3. Tables 402 and 438 are described only as examples and are not limiting on the invention. Other tables may be generated from an optimization of service management application, such as optimization of service management application 300 in FIG. 3 within the scope of the invention. In a particular embodiment, the data need not be kept in tabular form. For example, the data may be kept in a relational database, in raw form, or in any other suitable form.

As an example, table 402 contains time log entries during an online service event and in an embodiment includes time field 404 that illustrates a specific time or time interval. User mood field 406 illustrates a specific mood as understood by optimization of service management application 300 in FIG. 3 at a specific time or during a time interval. Delta mood field 408 illustrates a change in the user's mood, if any, at a specific time or during a time interval.

Table 402 also contains action field 410 that illustrates a specific action or set of actions that occurred at a specific time or during a time interval. In an embodiment, table 402 may also contain additional or different fields, such as network metric field 412 that illustrates a measure of the network metric at a specific time or during a time interval. As another example, delta network metric field 414 may illustrate a change in the network metric at a specific time or during a time interval. In another embodiment, table 402 may also contain application performance metric field 416 that illustrates a measure of the application performance metric used for the online service event during at a specific time or during a time interval. Similarly, delta application performance metric field 418 may illustrate a change in the network metric at a specific time or during a time interval.

Time field 404 may indicate an actual time or indicate a time delta at which the user's emotional state was sampled. In an embodiment, the entry of 0000 may indicate midnight (12:00 p.m.). The values in each row for field 404 indicate sampling at different times following the initial sampling. These samplings may be performed at any interval, or based on any non-time trigger, for example, when five (5) actions have been taken by the user, such as five mouse clicks or keyboard strokes. In an embodiment, the interval may be a combination of a time interval and an action interval where if a predetermined number of actions have not been taken after a predetermined time interval, then the interval is over. Alternatively, if a predetermined number of actions have been taken, such as ten (10) mouse clicks or keyboard strokes before a predetermined time interval is over, then the interval is over.

Mood field 406 may illustrate the perceived mood of the user during the online service event as understood by optimization of service management application 300 in FIG. 3. Initially, the mood of the user may be detected by using the mood of a recently completed online service event or by using keyboard 306, computer mouse 308, microphone 310, and web camera 312 in FIG. 3 either singularly or in any combination. After the initial mood of the user is determined, the mood of the user may be detected by using keyboard 306, computer mouse 308, microphone 310, and/or web camera 312 in FIG. 3 either singularly or in any combination.

In an embodiment, the mood of the user is quantified using a one to ten (1-10) scale with ten (10) being the happiest. As illustrated in mood field 406 of initial interval 420, the mood of the user was determined to be happy and is indicated as an eight (8). Other means can be used to quantify the mood of the user, for example, numbers such as a one to one hundred scale (1-100), letters such as an "H" for happy or "F" for frustrated, alpha-numeric designations such as "H1" for very happy and "H10" for only moderately happy, or a color coding system may be used to illustrate the mood of the user.

The change in the user's mood, if any, may be illustrated in delta mood field 408. In an embodiment, a mood indicator 432 may illustrate if the user's happiness or satisfaction has increased, decreased, or remained the same. Mood indicator 432 may be presented in any manner suitable for a particular implementation without limitation on the invention. For example, if the user's happiness or satisfaction has increased from the last interval, an up arrow or smiley face graphic or image may be used, if the user is becoming frustrated or angry since the last interval, a down arrow or frowning face graphic or image may be used. In another embodiment, if the mood of the user is quantified using a numeric scale, then the difference in mood from one interval to the next interval may be illustrated. For example, if the mood of the user is quantified using a one to ten (1-10) scale, as in FIG. 4, then the change in mood from initial interval 420, mood level 8, to first interval 422, mood level 6, is a decrease of two (2) units.

Action field 410 may present information about a specific action or set of actions that occurred at the time in time field 404 or during the interval in time field 404. The specific action or set of actions may be presented in any manner suitable for a particular implementation without limitation on the invention. For example, at time 0000 the online service event was started. During first event 422, time field 404 registers 0001 to show that a first time interval had occurred. Action field 410 for first event 422 illustrates that during the first time interval, several links were clicked during the period between 0000 and 0001. In an embodiment, codes or code words may be used to illustrate a specific action or set of actions.

Network metric field 412 may illustrate an indicator of a network metric used for the online service event at the time in time field 404 or during the interval in time field 404. While the invention is described in terms of a single metric, a particular embodiment may use multiple such metrics. Network metric field 412 may illustrate, for example, an indication of the speed of the path, packet loss, router congestion/conditions, latency or delay, path reliability, path bandwidth, noise, and throughput. These example application operations are not intended to be limiting on the invention. Many other additional or different application operations will be apparent to those of ordinary skill in the art and the same are contemplated within the scope of the invention.

In an embodiment, the functionality of the network used for the online service event may be quantified using a one to ten (1-10) scale with ten being the highest. For example, as illustrated in network metric field 412 of first event 422, the network metric for the online service event was designated as a six (6). The metric may reference the status of the service as a whole (e.g. widespread congestion), or to the portion of the network service most relevant to the user experience. Other indicators may be used to designate the functionality of the network, for example, numbers such as a one to one hundred scale (1-100), letters such as an "F" for functioning or "E" for error in the network, alpha-numeric designations such as "F1" for functioning at optimum and "F10" for barely functioning at optimum, or a color coding system may be used to illustrate a measure of the network metric.

The change in the network metric, if any, may be illustrated in delta network metric field 414. In an embodiment, network metric indicator 434 illustrates if the network metric has increased, decreased, or remained the same. Network metric indicator 434 may be presented in any manner suitable for a particular implementation without limitation on the invention.

For example, if the network metric has increased from the last interval, an up arrow or smiley face graphic or image may be used, if the network metric has decreased since the last interval, a down arrow or frowning face graphic or image may be used. In another embodiment, if the network metric is quantified using a numeric scale, then the difference in the network metric from one interval to the next interval may be illustrated. For example, if the network metric is quantified using a one to ten (1-10) scale, as in FIG. 4, then the change in the network metric from initial interval 420, network metric level six (6), to first interval 422, network metric level six (6), is zero (0)

Application performance metric field 416 may illustrate an indicator of the application performance metric used for the online service event at the time in time field 404 or during the interval in time field 404. Application performance metric field 416 may illustrate a measure of the operation or use of the application that the user is currently using and may include, for example, the application response time, number of mouse-clicks used when navigating the application, if a user clicks the wrong indicator, or if the user may be confused about using the application and did not press a "submit" or "purchase" indicator when prompted. These example application operations are not intended to be limiting on the invention. Many other additional or different application operations will be apparent to those of ordinary skill in the art and the same are contemplated within the scope of the invention.

In an embodiment, the functionality of the application used for the online service event may be quantified using a one to ten (1-10) scale with ten being the highest. For example, as illustrated in application performance metric field 416 of first event 422, the application performance metric used for the online service event was designated as a six (6). Other indicators may be used to designate the functionality of the application used for the online service event. For example, numbers such as a one to one hundred scale (1-100), letters such as an "F" for functioning or "E" for error in the application, alpha-numeric designations such as "F1" for functioning at optimum and "F10" for barely functioning at optimum, or a color coding system may be used to illustrate a measure of the application performance metric.

The change in the application performance metric, if any, may be illustrated in delta application performance metric field 418. In an embodiment, indicator 436 illustrates if the application performance metric has increased, decreased, or remained the same. Application performance metric indicator 436 may be presented in any manner suitable for a particular implementation without limitation on the invention.

For example, if the application performance metric has increased from the last interval, an up arrow or smiley face graphic or image may be used, if the network metric has decreased since the last interval, a down arrow or frowning face graphic or image may be used. In another embodiment, if the application performance metric is quantified using a numeric scale, then the difference in the network metric from one interval to the next interval may be illustrated. For example, if the application performance metric is quantified using a one to ten (1-10) scale, as in FIG. 4, then the change in the application performance metric from initial interval 420, application performance metric level eight (8), to first interval 422, application metric level six (6), is a decrease of two (2) units.

As shown in example table 402, the mood of the user declined as the network metric and the application performance metric declined and table 402 illustrates what occurred during the online service event. Specifically, during first interval 420, the user started the online service event, the mood of the user was relatively high, but the network metric was not high.

During first interval 420, after a predetermined interval, delta mood field 406 indicates that user mood field 406 has decreased two (2) units, from an eight (8) to a six (6). Delta network matrix field 414 indicates that network metric field 412 did not change and delta application matrix field 418 indicates that application field 416 has decreased 2 (2) units, from an eight (8) to a six (6). Action field 408 indicates that during first interval 420 the user clicked several links. The network metric did not change, but the delta application matrix field 418 indicates that application field 416 has decreased two (2) units.

The mood of the user may have gone down because the user may be having difficulty navigating the application being used for the service event and is clicking through several links. In an embodiment, corrective action may be taken to attempt to increase the application performance metric. For example, a help indicator or tips on navigating the application may be displayed to the user in action indicator 316 in FIG. 3.

During second interval 424, after a predetermined interval, delta mood field 406 indicates that user mood field 406 has increased one (1) unit, from a six (6) to a seven (7). Action field 410 indicates that during second interval 424 the user has not taken any action. The mood of the user may have gone up because the user found what they were looking for when they started the online service event.

During third interval 426, after a predetermined interval, delta mood field 406 indicates that user mood field 406 remained a seven (7), the same mood from the previous interval. Action field 410 indicates that during third time interval 426 the user has clicked an indicator. The indicator may be a purchase indicator or a link to a web page. The mood of the user may have stayed the same because the user found what they were looking for when they started the online service event and if the indicator is a purchase indicator, then user may have decided to purchase what they found.

During fourth interval 428, after a predetermined interval, delta mood field 406 indicates that user mood field 406 has decreased one (1) unit, from a seven (7) to a six (6). Action field 410 indicates that during the fourth time interval, the user has clicked the indicator repeatedly. Delta network matrix field 414 indicates that network metric field 412 decreased three (3) units, from a six (6) to a three (3). Delta application matrix field 418 indicates that application field 416 has decreased one (1) unit, from a seven (7) to a six (6). The decline in the network metric may be the reason the indicator is not responding.

In an embodiment, corrective action may be taken to attempt to increase the network metric. For example, if a path in the network is slow, a different, faster path may be attempted by metric determination module 320 in FIG. 3. In another example, the mood of the user has decreased, the user has clicked on a purchase or buy indicator repeatedly, and the network metric has reached zero (0) meaning the network connection to the online service is not functioning or has been terminated. Action indicator 316 in FIG. 3 may suggest the user call a displayed phone number or suggest an alternative way of communication, for example email, to finalize the purchase.

During fifth interval 430, after a predetermined interval, delta mood field 408 indicates that the mood field 406 decreased one (1) unit from a six (6) to a five (5). Action field 410 indicates that during fifth interval 430, the user has ended the online service. Delta network metric field 414 indicates that network metric field 412 has increase by one (1) unit. Delta application performance metric field 418 indicates that application performance metric field 416 has stayed the same. The low network metric indicating an improperly functioning network may be the reason the user ended the online service event.

As shown in example table 438, the mood of the user increased even though the mood of the user was initially relatively low and the network metric declined overall. For example, the initial mood of the user shown in initial interval 440, was determined to be unhappy and was indicated as a two (2). Table 438 illustrates a particular benefit of an optimization of service management application, such as optimization of service management application 300 in FIG. 3. Even though the final mood of the user corresponding to table 438 was the same as the user corresponding to table 402, the user corresponding to table 438 had a better overall experience. Specifically, during initial interval 440, the user started the online service event. The mood of the user was relatively low, a two (2) and because network metric field 412 illustrates a four (4) for initial interval 440, the network was not functioning at or near an optimum level.

During first interval 442, after a predetermined interval, delta mood field 408 indicates that mood field 406 has increased by one (1) unit, from a two (2) to a three (3). Action field 408 indicates that during first interval 442, the user has clicked several links. Delta network metric field 414 indicates that network metric field 412 increased three (3) units, from a four (4) to a seven (7). Delta application matrix field 418 indicates that application field 416 has decreased two (2) units, from an eight (8) to a six (6).

In an embodiment, the metric determination module 320, in FIG. 3, may have determined that a path bandwidth was particularly low in the network and rerouted the network through a faster path, thereby increasing the network metric and possibly increasing the mood of the user. In an embodiment, nothing is done about the decrease in the application performance metric because the mood of the user increased. In another embodiment, if the network metric or the application performance metric dropped below a threshold level, for example, three (3), then action may be taken regardless of the user's mood. An additional determination of mood may be done after action is taken to evaluate the effect of the action on the user experience.

During second interval 444, after a predetermined interval, delta mood field 408 indicates that mood field 406 increased by one (1) unit, from a three (3) to a four (4). Action field 408 indicates that during second time interval 444 the user has not taken any action and stayed on a specific web page. Delta network metric field 414 indicates that network metric field 412 decreased by one (1) unit, from a seven (7) to a six (6). Delta application matrix field 418 indicates that application field 416 has increased by one (1) unit, from a six (6) to a seven (7). The mood of the user may have gone up because the user may be happy about the many links related to the online service event.

During third interval 446, after a predetermined interval, delta mood field 408 indicates that mood field 406 has increased by one (1) unit, from a four (4) to a five (5). Action field 408 indicates that during the third interval 446, the user has clicked an indicator. Delta network metric field 414 indicates that the network metric field 412 decreased one (1) unit, from six (6) to five (5). Delta application matrix field 418 indicates that application field 416 stayed the same at seven (7). The mood of the user may have gone up because the user found what they were looking for when they started the online service event and if the indicator is a purchase indicator, the user may have decided to purchase what they found.

During fourth interval 448, after a predetermined interval, delta mood field 408 indicates that mood field 406 stayed the same, at five (5). Action field 408 indicates that during fourth interval 448, the user has ended the online service. Delta network metric field 414 indicates that network metric field 412 decreased one (1) unit, from a five (5) to a four (4). Delta application matrix field 418 indicates that application field 416 stayed the same at seven (7). Despite network metric field 412 declining during most of the online service, the mood of the user increased.

Comparing table 402 and table 438 illustrates why measuring the delta or overall change in mood during an online event is important. If only the final mood were to be measured, a conclusion could be reached that neither user had a positive experience. By comparing the delta or overall change in mood during the online event, it may be concluded that the overall mood of the user corresponding to table 438 increased. Even though the mood of the user corresponding to table 438 was the same as the user corresponding to table 402, the user corresponding to table 438 had a positive online service event experience while the user corresponding to table 402 did not have a positive online service event experience. Further, by correlating the network metric and the application performance metric, remedial action may be taken to try and alleviate any frustrations or issues the user may be having during the online event.

Figure 5:
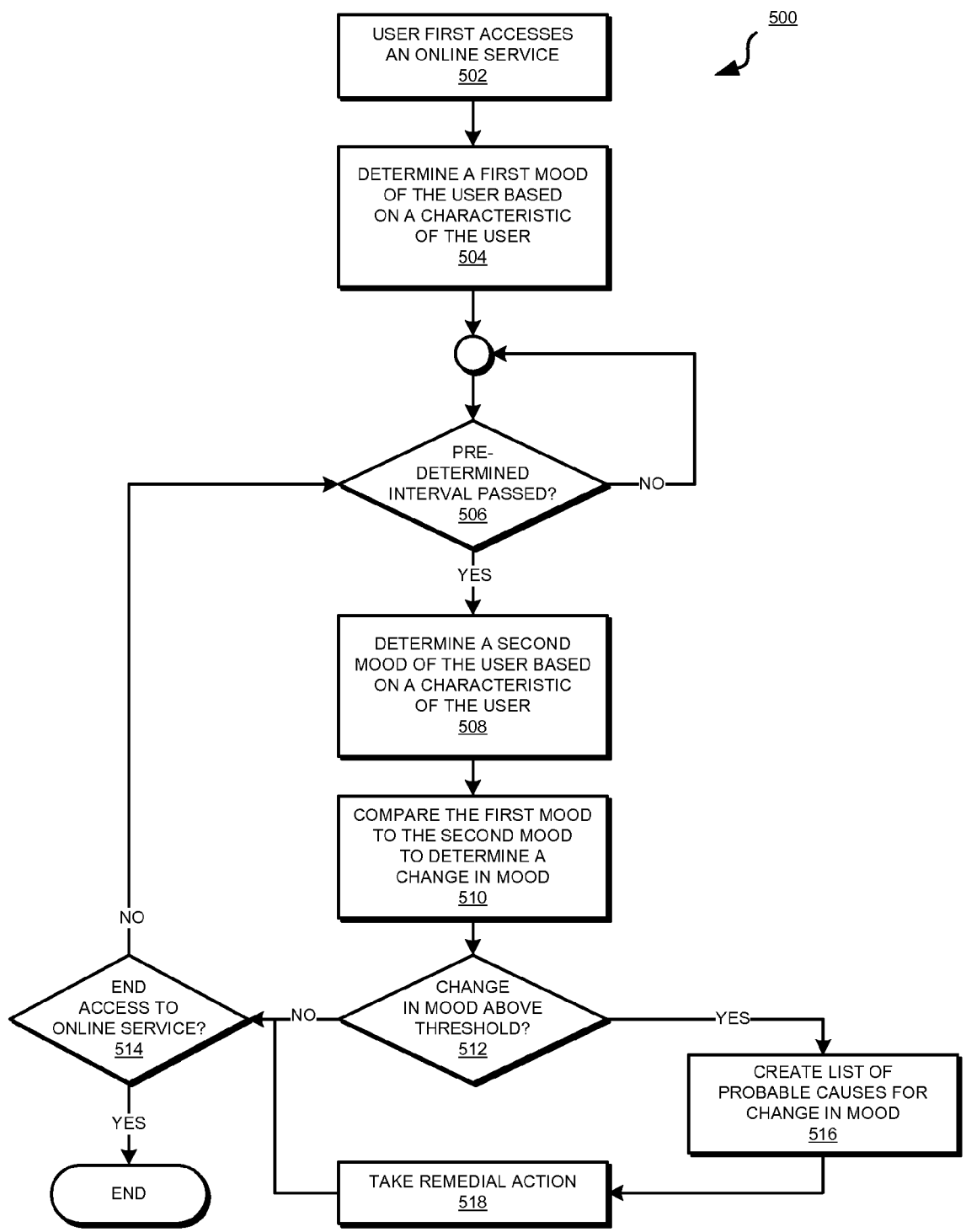
FIG. 5 depicts a flowchart of an example process for optimization of service management using subjective user experience metrics in accordance with an illustrative embodiment.

With reference to FIG. 5, this figure depicts a flowchart of an example process for optimization of service management using subjective user experience metrics in accordance with an illustrative embodiment. Process 500 may be implemented as part of an optimization of service management application, such as optimization of service management application 300 in FIG. 3. Optimization of service management using subjective user experience metrics may be achieved by measuring the delta or change between the emotional state of the user at a first sample time, and the emotional state of the user at a second sample time and identifying probable causes of the change of user's emotional state. In an embodiment, action is taken based on the difference in emotional state. Process 500 begins by a user accessing a service (step 502). For example, in one embodiment, an online service may be accessed using optimization of service management application 300 in FIG. 3.

At a first time, process 500 determines a first mood of the user based on the characteristic of the user as understood by an optimization of service management application (step 504). For example, in one embodiment, process 500 may be implemented to determine the mood of the user by using the mood of a recently completed service event or by using keyboard 306, computer mouse 308, microphone 310, and/or web camera 312 in FIG. 3, either singularly or in any combination to interpret the characteristic of the user and determine a mood of the user as understood by an optimization of service management application 300 in FIG. 3. For example, keyboard 306 having a key sensing device may detect the force the user is using to operate the keys on keyboard 306. Computer mouse 308 may have a sensing device that provides pressure sensing levels applied to computer mouse 308 such that the force the user is gripping computer mouse 308 may be determined. These examples to obtain the characteristic of the user are not intended to be limiting on the invention. Many other additional or different application operations will be apparent to those of ordinary skill in the art and the same are contemplated within the scope of the invention.

Process 500 determines whether an amount of time and/or events have passed (step 506). The amount of time may be any duration. For example, the amount of time may be one second, five seconds, ten seconds, one minute, or any other amount of time that may provide a basis for measuring a first or initial mood of the user and then a second mood of the user such that a change in mood, if any, can be determined. The events may be a based on a non-time trigger such as when a certain number of actions have been performed by the user. For example, the events may be when five (5) actions have been taken by the user, such as five (5) mouse clicks or keyboard strokes. In an embodiment, the events may be a combination of an amount of time and an action interval where if a predetermined number of actions have not been taken after an amount time, then the interval is over. Alternatively, if a predetermined number of actions have been taken, such as ten (10) mouse clicks or keyboard strokes before an amount of time interval is over, then the interval is over.

If process 500 determines that the amount of time and/or events have not passed, ("No" path of step 506), then process 500 returns to determine whether the amount of time and/or events have passed (step 506). If process 500 determines that the amount of time and/or events have passed, ("Yes" path of step 506), process 500 determines a second mood of the user based on a characteristic of the user (step 506) as understood by an optimization of service management application. In one embodiment, process 500 may be implemented to determine the mood of the user by using keyboard 306, computer mouse 308, microphone 310, and/or web camera 312 in FIG. 3, either singularly or in any combination to interpret the characteristic of the user and determine a mood of the user as understood by an optimization of service management application 300 in FIG. 3.

Process 500 compares the first mood to the second mood to determine a change in the user's mood (step 510) and process 500 determines whether the change in mood is above a threshold (step 512). For example, if the first mood was a five (5) and the second mood was a three (3) then the mood of the user decreased by two (2) units. If the threshold is a decrease of two (2) units in mood, then the change in mood satisfies the threshold. In another embodiment, the threshold is not a decrease in mood but an overall mood rating such that if the mood of the user is a three (3), then the mood of the user may be satisfy a threshold mood rating of three (3).

If process 500 determines the threshold has been satisfied, ("Yes" path of step 512), then process creates a list of probable causes for the change in mood (step 514). For example, in one embodiment, process 500 may be implemented to determine probable cause for the change in mood by determining a network metric or change in network metric and/or an application performance metric or change in application performance metric using metric determination module 320 in FIG. 3. The network metric or change in network metric and/or an application performance metric or change in application performance metric are correlated to the change in mood to create a list of probable causes for the change in mood.

Process 500 takes action based on the list of probable causes for the change in mood (step 516). For example, in one embodiment, process 500 may be implemented to take action by displaying user experience metrics 314 and/or action indicator 316 in FIG. 3. In another embodiment, the action is taken by metric determination module 320 in FIG. 3. In an embodiment, after action 518 is taken, an additional sampling of the user emotional characteristics is made and compared with previous samples of the user emotional characteristics to determine the efficacy of the action taken. The process 500 then ends thereafter. If process 500 determines the threshold has not been satisfied, ("No" path of step 512), then process 500 ends thereafter. In a particular embodiment, process 500 does not end but returns to step 506 and process 500 determines whether an amount of time and/or events have passed (step 506) as described above.

Figure 6:
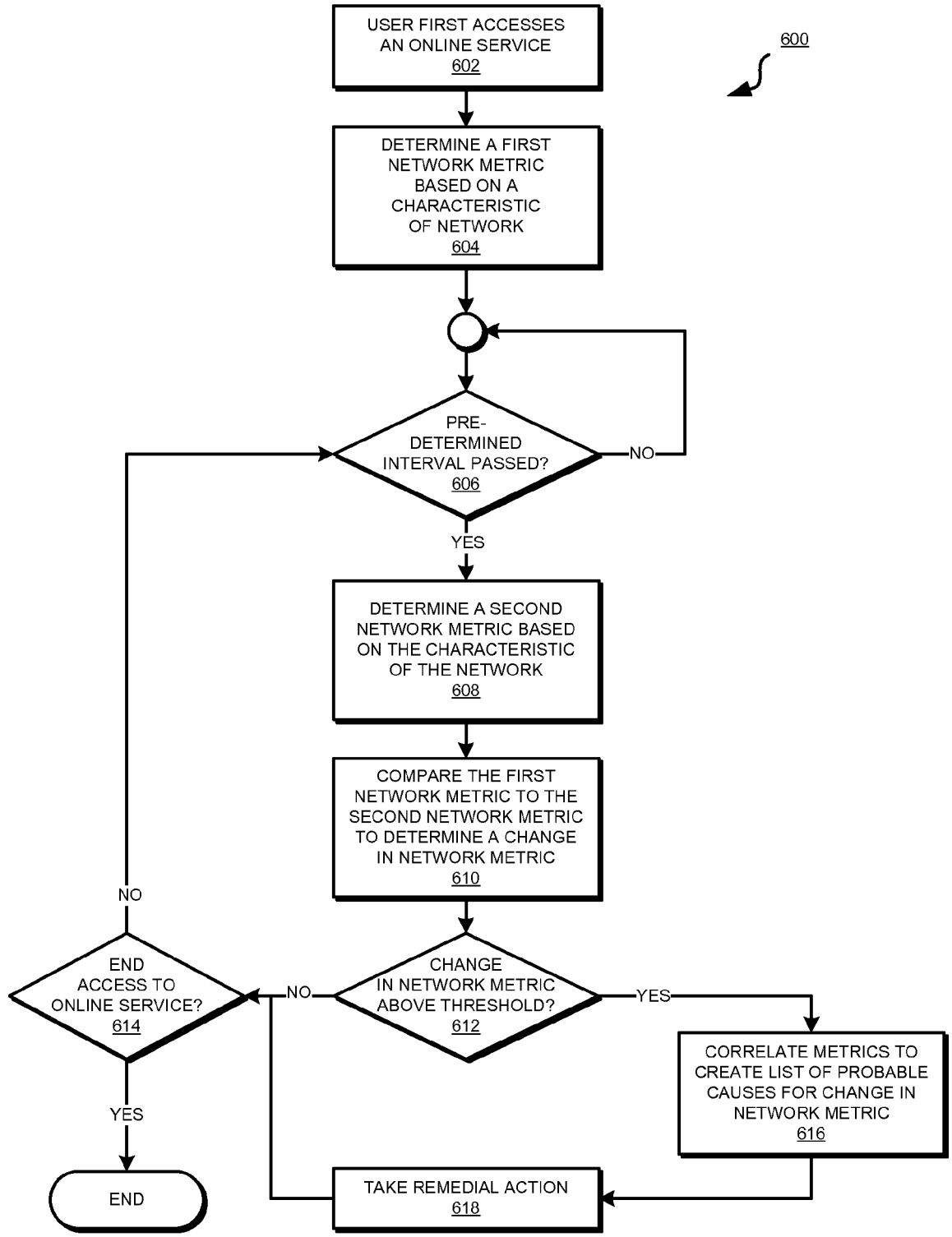
FIG. 6 depicts a flowchart of an example process for optimization of service management using subjective user experience metrics in accordance with an illustrative embodiment.

With reference to FIG. 6, this figure depicts a flowchart of an example process for optimization of service management using subjective user experience metrics in accordance with an illustrative embodiment. Process 600 may be implemented as part of an optimization of service management application, such as optimization of service management application 300 in FIG. 3.

Process 600 begins by a user accessing an online service (step 602). For example, in one embodiment, an online service may be accessed using optimization of service management application 300 in FIG. 3.

At a first time, process 600 determines a first network metric based on a characteristic of a network being used for the online service (step 604). For example, in one embodiment, process 600 may be implemented to determine a first network metric based on a characteristic of a network by using metric determination module 320 in FIG. 3.

Process 600 determines whether an amount of time and/or events have passed (step 606). The amount of time may be any duration. For example, the amount of time may be one second, five seconds, ten seconds, one minute, or any other amount of time that may provide a basis for measuring a first or initial mood of the user and then a second mood of the user such that a change in mood or emotional state, if any, can be determined. The events may be a based on a non-time trigger such as when a certain number of actions have been performed by the user. For example, the events may be when five (5) actions have been taken by the user, such as five (5) mouse clicks or keyboard strokes. In an embodiment, the events may be a combination of an amount of time and an action interval where if a predetermined number of actions have not been taken after an amount time, then the interval is over. Alternatively, if a predetermined number of actions have been taken, such as ten (10) mouse clicks or keyboard strokes before an amount of time interval is over, then the interval is over.

If process 600 determines that the amount of time and/or events have not passed, ("No" path of step 606), then process 600 returns to determine whether the amount of time and/or events have passed (step 606). If process 600 determines that the amount of time and/or events have passed, ("Yes" path of step 606), process 600 determines a second network metric based on a characteristic of the network (step 608). In one embodiment, process 600 may be implemented to determine a first network metric based on a characteristic of a network by using metric determination module 320 in FIG. 3.

Process 600 compares the first network metric to the second network metric to determine a change in the network metric (step 610) and process 600 determines whether the change in network metric is above a threshold (step 612). For example, if the first network metric was a five (5) and the second network metric was a three (3) then the network metric decreased by two (2) units. If the threshold is a decrease of two (2) units in network metric, then the change in the network metric satisfies the threshold. In another embodiment, the threshold is not a decrease in network metric but an overall network metric rating such that if the network metric of the network is a three (3), then the network metric would satisfy a threshold network metric rating of three (3).

If process 600 determines the threshold has been satisfied, ("Yes" path of step 612), then process creates a list of probable causes for the change in the network metric (step 614). For example, in one embodiment, process 600 may be implemented to determine a list of probable causes for the change in the network metric by using metric determination module 320 in FIG. 3.

Process 600 takes action based on the list of probable causes for the change in the network metric (step 616). For example, in one embodiment, process 600 may be implemented to take action by metric determination module 320 in FIG. 3. The process 600 then ends thereafter. If process 600 determines the threshold has not been satisfied, ("No" path of step 612), then process 600 ends thereafter. In a particular embodiment, process 600 does not end but returns to step 606 and process 600 determines whether an amount of time and/or events have passed (step 606) as described above.

Figure 7:
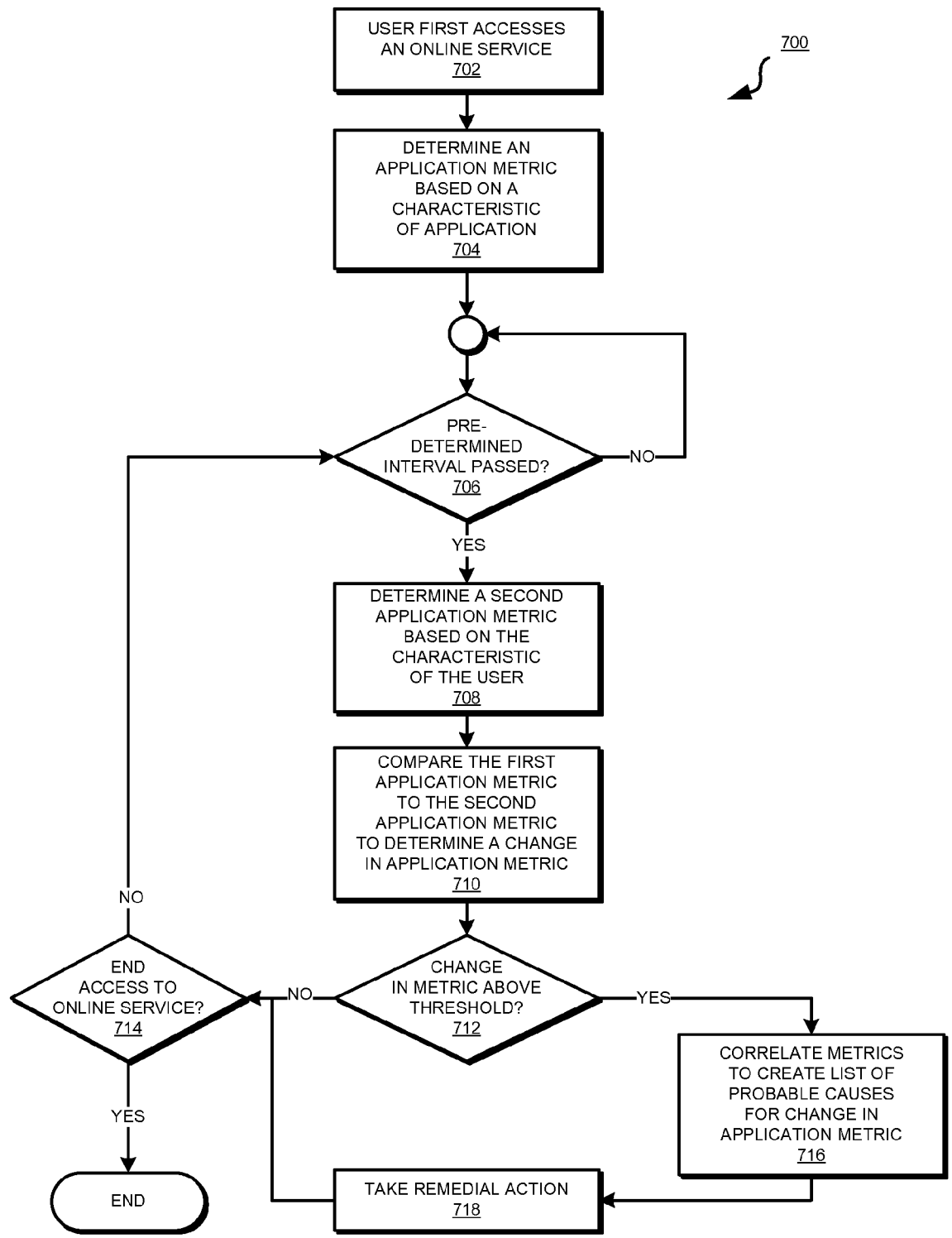
FIG. 7 depicts a flowchart of an example process for optimization of service management using subjective user experience metrics in accordance with an illustrative embodiment.

With reference to FIG. 7, this figure depicts a flowchart of an example process for optimization of service management using subjective user experience metrics in accordance with an illustrative embodiment. Process 700 may be implemented as part of an optimization of service management application, such as optimization of service management application 300 in FIG. 3.

Process 700 begins by a user accessing an online service (step 702). For example, in one embodiment, an online service may be accessed using optimization of service management application 300 in FIG. 3.

At a first time, process 700 determines a first network application performance metric based on a characteristic of the application being used for the online service (step 704). For example, in one embodiment, process 700 may be implemented to determine a first application performance metric based on a characteristic of an application by using metric determination module 320 in FIG. 3.

Process 700 determines whether an amount of time and/or events have passed (step 706). The amount of time may be any duration. For example, the amount of time may be one second, five seconds, ten seconds, one minute, or any other amount of time that may provide a basis for measuring a first or initial mood of the user and then a second mood of the user such that a change in mood, if any, can be determined. The events may be a based on a non-time trigger such as when a certain number of actions have been performed by the user. For example, the events may be when five (5) actions have been taken by the user, such as five (5) mouse clicks or keyboard strokes. In an embodiment, the events may be a combination of an amount of time and an action interval where if a predetermined number of actions have not been taken after an amount time, then the interval is over. Alternatively, if a predetermined number of actions have been taken, such as ten (10) mouse clicks or keyboard strokes before an amount of time interval is over, then the interval is over.

If process 700 determines that the amount of time and/or events have not passed, ("No" path of step 706), then process 700 returns to determine whether the amount of time and/or events have passed (step 706). If process 700 determines that the amount of time and/or events have passed, ("Yes" path of step 706), process 700 determines a second application performance metric based on the characteristic of the application being used for the online service (step 708). In one embodiment, process 700 may be implemented to determine a second application performance metric based on the characteristic of an application by using metric determination module 320 in FIG. 3.

Process 700 compares the first application performance metric to the second application performance metric to determine a change in the application performance metric (step 710) and process 700 determines whether the change in the application performance metric is above a threshold (step 712). For example, if the first application performance metric was a five (5) and the second application performance metric was a three (3) then the application performance metric decreased by two (2) units. If the threshold is a decrease of two (2) units in the application performance metric, then the change in the application performance metric satisfies the threshold. In another embodiment, the threshold is not a decrease in the application performance metric but an overall application performance metric such that if the application performance metric is a three (3), then the application performance metric satisfies a threshold rating of three (3).

If process 700 determines the threshold has been satisfied, ("Yes" path of step 712), then process creates a list of probable causes for the change in the application performance metric (step 714). For example, in one embodiment, process 700 may be implemented to determine a list of probable causes for the change in the application performance metric by using metric determination module 320 in FIG. 3.

Process 700 takes action based on the list of probable causes for the change in the application performance metric (step 716). For example, in one embodiment, process 700 may be implemented to take action by using metric determination module 320 in FIG. 3. The process 700 then ends thereafter. If process 700 determines the threshold has not been satisfied, ("No" path of step 712), then process 700 ends thereafter. In a particular embodiment, process 700 does not end but returns to step 706 and process 700 determines whether an amount of time and/or events have passed (step 706) as described above.

Figure 8:
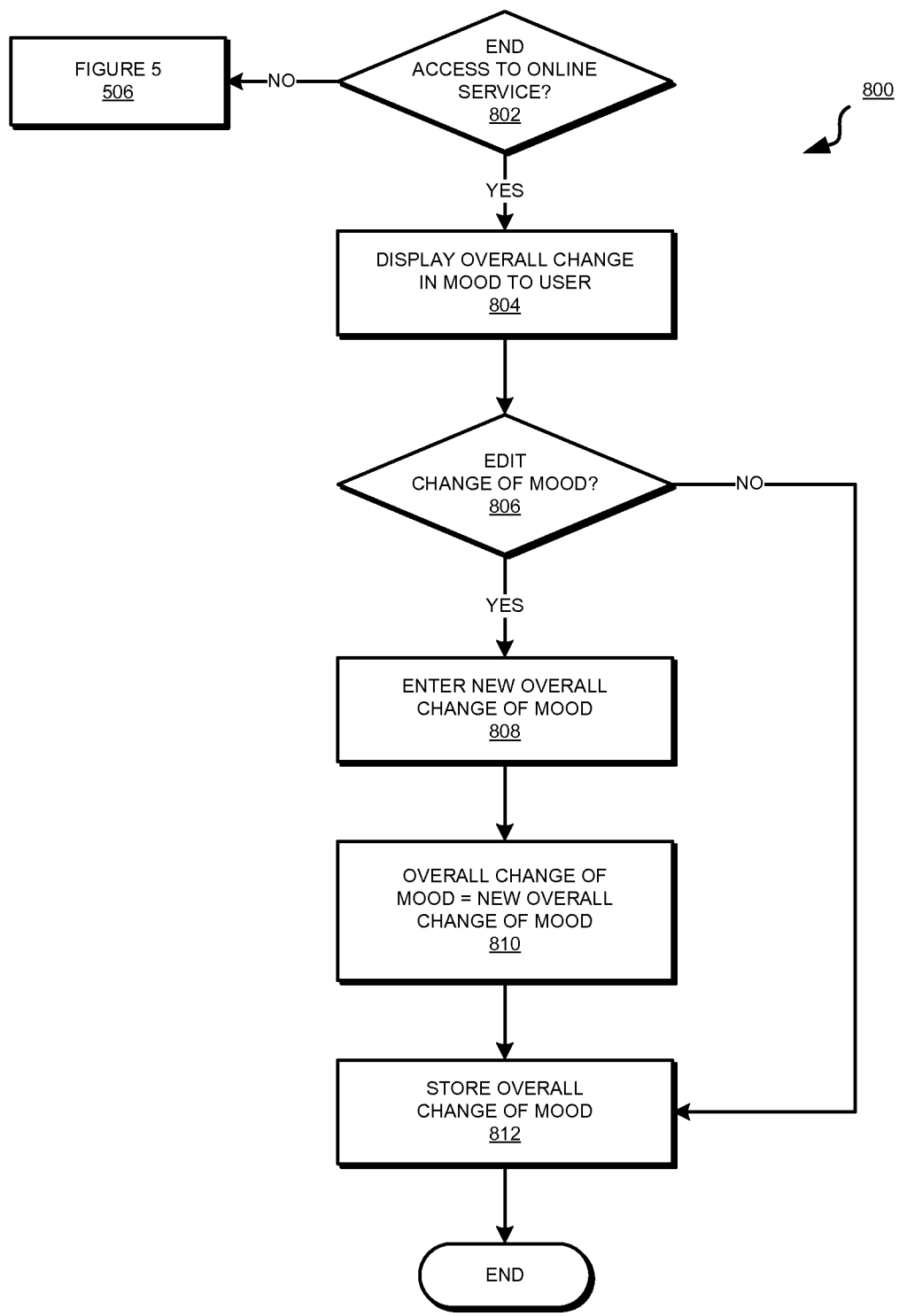
FIG. 8 depicts a flowchart of an example process for optimization of service management using subjective user experience metrics in accordance with an illustrative embodiment.

With reference to FIG. 8, this figure depicts a flowchart of an example process for optimization of service management using subjective user experience metrics in accordance with an illustrative embodiment. Process 800 may be implemented as part of an optimization of service management application, such as optimization of service management application 300 in FIG. 3.

After the mood or emotional state has been sampled at least a second time, process 800 displays an overall change of mood indicator to the user (step 802). For example, process 800 may display a drop in mood of three (3) units from initial interval 420 (eight (8)) to fifth interval 430 (five (5)) as shown in table 402 in FIG. 4 or an increase in mood of three (3) units from initial interval 440 (two (2)), to fourth interval 448 (five (5)) as shown in table 438 in FIG. 4.

Process 800 determines if the user wants to edit the overall change in mood (step 804). The user may want to edit the overall change in mood if the mood change was unrelated to the online service. For example, the mood may increase if user received a phone call about good news that was unrelated to the online service experience or the mood may decrease if the user had become annoyed by factors other than the online service, such as a neighbors barking dog.

If process 800 determines the user does not want to edit the overall change in mood, ("No" path of step 806), then process 800 stores the overall change in mood for future reference (step 810). In an embodiment, process 800 may store other information related to the online service for example, the information found in tables 402 and 438 in FIG. 4. The stored information may be used to increase the overall satisfaction of the online service. In addition, the stored information may be used to create a history for the user.

If process 800 determines the user wants to edit the overall change in mood, ("Yes" path of step 804), then process 800 prompts the user to enter a new overall change of mood (step 806), stores the new user entered overall change in mood (step 808), and process 800 stores the overall change in mood for future reference (step 810) as described above, and then process 800 ends thereafter. Processes 600-800 may each be used with process 500 or in any combination.

The illustrative embodiments do more than perform an action based on a user's current mood. The illustrative embodiments relate to measuring the quality of experience of using a service. The effect that using the service has on the mood of a user can be determined by measuring the delta, or change, in mood between a first sampling of the emotional state of the user, and a later, second sampling of the emotional state of the user. These samplings may occur at the start and end of a service, or may occur during the service. In addition, by capturing the activities or functions that the user was performing during the service and capturing application and network metrics during the service, a relationship between user's emotional state, activities or functions performed, and application and network metrics may be established and used to determine a probable cause for the user's change in mood.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

In an embodiment, an action is taken when the change in mood of the user exceeds a threshold. In another embodiment, the method, system, and computer usable program product determines a metric for the online service, correlates the change in mood of the user to the metric, and takes action to correct a deficiency in the metric for the online service.

By measuring the delta between the emotional state of the user at a first time during the providing of the service, and the emotional state of the user at a second time during the providing of a service, and by measuring at least one of network and application performance metrics each time the emotional state of the user is measured, a correlation between the change in a user's mood and a change in a network or application performance metric can be determined. The correlation between the change in the user's mood and a change in the network or application performance metric allows the ability to determine a probable cause that led to the change in the user's mood. In an embodiment, the activities or functions that the user was performing are captured and correlated with the network and application performance metrics to determine a probable cause that lead to the change in the user's emotional state or mood. For example, if the delta, or change in the user's mood decreases as the user is trying to navigate an online event, a correlation between the user's mood while trying to navigate the online event and the network metrics indicating a low data rate may be the cause of the user's frustration and decrease in mood.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for determining a subjective experience of using a data network, the computer implemented method comprising:
performing a first analysis of a first input provided by a human user, the first input being provided using a device coupled with a computer at a first time during a use of the data network at the computer, the device being configured to receive inputs from the human user, the first analysis resulting in a first characteristic;
determining, in a first application executing in the computer, a first mood metric of the human user based on the first characteristic;
performing a second analysis of a second input provided by the human user, the second input being provided using the device at a second time during the use of the data network at the computer, the second analysis resulting in a second characteristic;
determining a second mood metric of the user based on the second characteristic;
comparing the first mood metric with the second mood metric to determine a change in a mood metric of the human user;
relating the change in the mood metric with a performance metric of the data network to identify performance problem in a network path in the data network;
determining an application performance metric of an application used by the human user, wherein the application performance metric measures a number of times the human user has to click a pointing device to navigate in the application;
relating the change in the mood metric with the application performance metric; and
taking an action over the data network when the change in mood metric of the human user exceeds a threshold, wherein the action comprises:
switching the human user to a different network path in the data network to remove the performance problem; and
notifying the human user about the switching.

2. The computer implemented method of claim 1, further comprising
determining a third mood metric of the human user, wherein the third mood metric is based on a third characteristic at a third time after the action is taken and during the use of the data network; and
comparing the third mood metric of the human user and the second mood metric of the human user to determine a second change in mood metric of the human user.

3. The computer implemented method of claim 1, wherein the performance metric measures a path reliability of the network path.

4. The computer implemented method of claim 1, wherein the performance metric measures a congestion in the network path.

5. A data processing system for determining a subjective experience of using a data network, the data processing system comprising:
a storage device, wherein the storage device stores computer usable program code; and
a processor, wherein the processor executes the computer usable program code, and wherein the computer usable program code comprises:
computer usable code for performing a first analysis of a first input provided by a human user, the first input being provided using a device coupled with the data processing system at a first time during a use of the data network at the data processing system, the device being configured to receive inputs from the human user, the first analysis resulting in a first characteristic;
computer usable code for determining, in a first application executing in the data processing system, a first mood metric of the human user based on the first characteristic;
computer usable code for performing a second analysis of a second input provided by the human user, the second input being provided using the device at a second time during the use of the data network at the data processing system, the second analysis resulting in a second characteristic;
computer usable code for determining a second mood metric of the user based on the second characteristic;
computer usable code for comparing the first mood metric with the second mood metric to determine a change in a mood metric of the human user;
computer usable code for relating the change in the mood metric with a performance metric of the data network to identify performance problem in a network path in the data network;
computer usable code for determining an application performance metric of an application used by the human user, wherein the application performance metric measures a number of times the human user has to click a pointing device to navigate in the application;
computer usable code for relating the change in the mood metric with the application performance metric; and
computer usable code for taking an action over the data network when the change in mood metric of the human user exceeds a threshold, wherein the action comprises:
computer usable code for switching the human user to a different network path in the data network to remove the performance problem; and
computer usable code for notifying the human user about the switching.

6. A computer usable program product comprising a computer usable storage device including computer usable code for determining a subjective experience of using a data network, the computer usable code comprising:
computer usable code for performing a first analysis of a first input provided by a human user, the first input being provided using a device coupled with a computer at a first time during a use of the data network at the computer, the device being configured to receive inputs from the human user, the first analysis resulting in a first characteristic;
computer usable code for determining, in a first application executing in the computer, a first mood metric of the human user based on the first characteristic;
computer usable code for performing a second analysis of a second input provided by the human user, the second input being provided using the device at a second time during the use of the data network at the computer, the second analysis resulting in a second characteristic;
computer usable code for determining a second mood metric of the user based on the second characteristic;
computer usable code for comparing the first mood metric with the second mood metric to determine a change in a mood metric of the human user;
computer usable code for relating the change in the mood metric with a performance metric of the data network to identify performance problem in a network path in the data network;

computer usable code for determining an application performance metric of an application used by the human user, wherein the application performance metric measures a number of times the human user has to click a pointing device to navigate in the application;

computer usable code for relating the change in the mood metric with the application performance metric; and computer usable code for taking an action over the data network when the change in mood metric of the human user exceeds a threshold, wherein the action comprises:

computer usable code for switching the human user to a different network path in the data network to remove the performance problem; and computer usable code for notifying the human user about the switching.

7. The computer usable program product of claim 6, further comprising:

computer usable code for determining a third mood metric of the human user, wherein the third mood metric is based on a third characteristic at a third time after the action is taken and during the use of the data network; and computer usable code for comparing the third mood metric of the human user and the second mood metric of the human user to determine a second change in mood metric of the human user.

8. The computer usable program product of claim 6, wherein the performance metric measures a path reliability of the network path.

9. The computer usable program product of claim 6, wherein the performance metric measures a congestion in the network path.

10. The computer usable program product of claim 6, wherein the computer usable code is stored in a computer readable storage device in a data processing system, and wherein the computer usable code is transferred over a network from a remote data processing system.

11. The computer usable program product of claim 6, wherein the computer usable code is stored in a computer readable storage device in a server data processing system, and wherein the computer usable code is downloaded over a network to a remote data processing system for use in a computer readable storage device associated with the remote data processing system.

12. The computer implemented method of claim 1, wherein the device comprises a key pressure sensing device associated with a keyboard, wherein the key pressure sensing device determines an amount of pressure applied by the human user to a key on the keyboard, further comprising:

receiving, from the key pressure sensing device, a first amount of pressure corresponding to the first input by the human user at the first time;

receiving, from the key pressure sensing device, a second amount of pressure corresponding to the second input by the human user at the second time; and determining, responsive to the comparing, a changed amount of pressure by which the second amount of pressure is different from the first amount of pressure, the changed amount of pressure corresponding to the change in the mood metric of the human user.

13. The computer implemented method of claim 1, wherein the device comprises an audio analysis component associated with a microphone, wherein the audio analysis component determines a qualitative aspect of speech of the human user, further comprising:

receiving, from the audio analysis component, a first value of the qualitative aspect of a first speech by the human user at the first time, the first speech comprising the first input;

receiving, from the audio analysis component, a second value of the qualitative aspect of a second speech by the human user at the second time, the second speech comprising the second input; and determining, responsive to the comparing, a changed amount by which the second value of the qualitative aspect is different from the first value of the qualitative aspect, the changed amount corresponding to the change in the mood metric of the human user.

14. The computer implemented method of claim 1, wherein the device comprises a visual analysis component associated with a camera, wherein the visual analysis component determines a characteristic of visual expression of the human user, further comprising:

receiving, from the visual analysis component, a first value of the characteristic based on a first visual expression by the human user at the first time, the first visual expression comprising the first input;

receiving, from the visual analysis component, a second value of the characteristic based on a second visual expression by the human user at the second time, the second visual expression comprising the second input; and determining, responsive to the comparing, a changed amount by which the second value of the characteristic is different from the first value of the characteristic, the changed amount corresponding to the change in the mood metric of the human user.

15. The computer implemented method of claim 1, wherein the device comprises an analysis component associated with a biometric sensor, wherein the analysis component determines a characteristic of a biometric input of the human user, further comprising:

receiving, from the analysis component, a first value of the characteristic based on a first biometric input by the human user at the first time, the first biometric input comprising the first input;

receiving, from the analysis component, a second value of the characteristic based on a second biometric input by the human user at the second time, the second biometric input comprising the second input; and determining, responsive to the comparing, a changed amount by which the second value of the characteristic is different from the first value of the characteristic, the changed amount corresponding to the change in the mood metric of the human user.

16. The computer implemented method of claim 1, wherein the change in the mood metric of the human user corresponds to a combination of at least two of (i) a changed amount of pressure by which a second amount of pressure applied by the human user on a keyboard is different from a first amount of pressure applied by the human user on the keyboard, (ii) a changed amount by which the second value of a qualitative aspect of speech of the human user is different from a first value of the qualitative aspect of speech of the human user, (iii) a changed amount by which the second value of the characteristic of the second visual expression is different from the first value of the characteristic of the first visual expression, and (iv) a changed amount by which the second value of the characteristic of the second biometric input is different from the first value of the characteristic of the first biometric input.

* * * * *